United States Patent [19]

Altman

[11] Patent Number: 4,830,814
[45] Date of Patent: May 16, 1989

[54] INTEGRATED HEAD PACKAGE FOR A NUCLEAR REACTOR

[75] Inventor: Denis J. Altman, Penn Township, Westmoreland County, Pa.

[73] Assignee: Westinghouse Electric Corp., Pittsburgh, Pa.

[21] Appl. No.: 67,341

[22] Filed: Jun. 29, 1987

[51] Int. Cl.$^4$ .................... G21C 19/00; G21C 11/00
[52] U.S. Cl. .......................... 376/287; 376/263
[58] Field of Search ............... 376/263, 287, 260, 463

[56] References Cited

U.S. PATENT DOCUMENTS

| | | | |
|---|---|---|---|
| 3,752,737 | 8/1973 | Frisch et al. | 376/263 |
| 3,766,006 | 10/1973 | Frisch et al. | 376/263 |
| 3,836,429 | 9/1974 | Frisch et al. | 376/263 |
| 3,836,430 | 9/1974 | Frisch et al. | 376/263 |
| 3,851,906 | 12/1974 | Frisch et al. | 376/263 |
| 4,158,599 | 6/1979 | Andrews et al. | 376/263 |
| 4,678,623 | 7/1987 | Malandra et al. | 376/463 |
| 4,708,843 | 11/1987 | Desfontaines et al. | 376/262 |
| 4,716,007 | 12/1987 | Carlson et al. | 376/209 |

FOREIGN PATENT DOCUMENTS 2100496 12/1982 United Kingdom .

Primary Examiner—Deborah L. Kyle
Assistant Examiner—Daniel Wasil

[57] ABSTRACT

An integrated head package for a nuclear reactor has a pressure vessel closure head with control rod drive mechanisms thereon enclosed in a shroud, and a plurality of vertical lift rods secured to the vessel head with a missile shield plate extrending between the lift rods and vertically slidably retained between spaced stop members adjacent the upper ends of the lift rods. A lift rig is secured to the missile shield plate, preferably through attachment to support blocks secured to the upper surface of the plate. Impact forces of a missile against the lower surface of the missile shield plate are transferred to a lifting force and are not transferred to the lifting rods, head lugs, closure studs and pressure vessel supports.

15 Claims, 5 Drawing Sheets

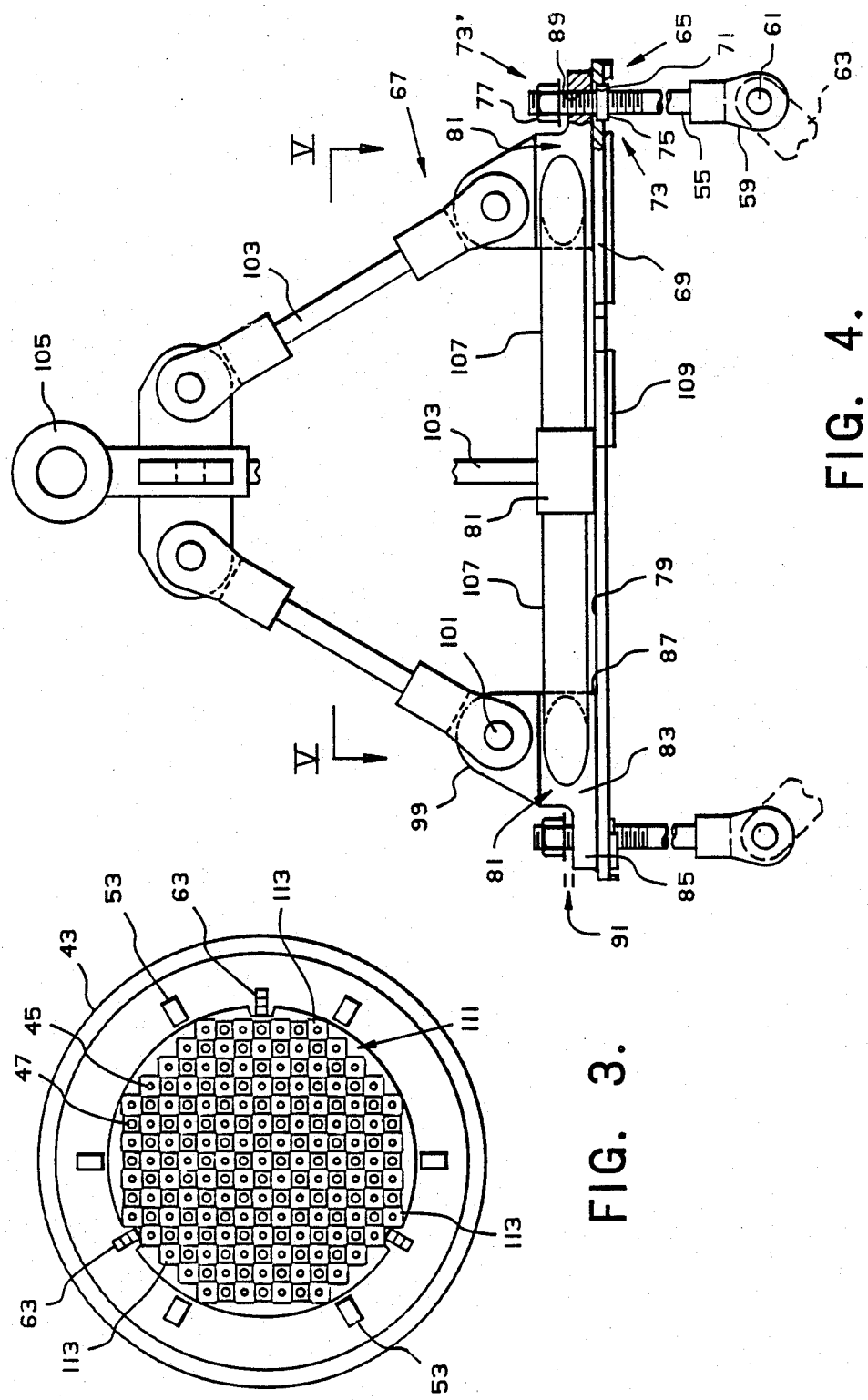

INTEGRATED HEAD PACKAGE FOR A NUCLEAR REACTOR

In the refueling of a nuclear reactor, the primary time consuming procedure is the removal of the upper structure or head package of the reactor.

In conventional reactors, the head package includes the pressure vessel head which seals the reactor vessel, control rod drive mechanisms which are used to raise and lower control rods in the core of the reactor, a seismic platform adjacent the upper ends of the control rod drive mechanisms, which laterally restrains the same, and various cables for operation of the control rod drive mechanisms. A missile shield, in the form of a concrete slab, is positionable above the head package to protect the containment housing and associated equipment from penetration by any of the control rod drive mechanisms in the event of a major break. The problems associated with such conventional head packages are further described in U.S. Pat. No. 4,678,623, and assigned to the assignee of the present invention, which patent is incorporated by reference herein. In such conventional plants, the large concrete slabs installed above the reactor vessel to act as a missile shield must be removed and stored prior to head disassembly and refueling of the reactor, and then must be replaced after the refueling and head reassembly. Such operations effect overall refueling time and radiation exposure and require space in the containment area for placement of the missile shield slabs when removed from the position above the reactor vessel.

In order to reduce refueling time, personnel exposure and space requirements, an improved system, designated as an integral head package plant has been developed which incorporates an integral missile shield and head lift rig. The missile shield is in the form of a perforated circular plate which is directly attached to a head lift rig. Such an integral head package (IHP) system is described in British Pat. No. 2100496 issued to the assignee of the present invention, and published Dec. 22, 1982, which application is incorporated by reference herein.

As described therein, and illustrated in FIG. 1 of the present drawings, an integral head package 1 includes a three-legged head lifting rig 3 that is pin connected at 5, by lift lugs 7, to a missile shield assembly 9. The perforated circular plate 11 that forms the missile shield acts as a spreader for the head lift load, and as a seismic support for the tops of the control rod drive mechanisms 13, with rod travel housings extensions 15 of the mechanisms protruding through apertures 17 in the circular plate 11. The missile shield 11 interfaces with the tops of the rod travel housings 15 which limits the overall vertical travel (and impact force) of a missile before it impacts the shield. The impact load of a missile against the underside of the perforated plate 11 is transmitted to head lift rods 19, through vessel head lift lugs 21 secured to the vessel head 23, and closure studs 25 to the vessel head 23, and ultimately to the vessel supports. A cooling shroud 27 surrounds the drive rod mechanisms 13, while electric cabling 29 is routed from the top of the control rod drive mechanisms 13 to a connector plate 31 and thence along a cable tray 33 to respective cable terminations. Cooling fans 35 circulate air within the shroud 27 to transfer waste heat from the control rod drive mechanism 13. Hoist supports 37, and trolleys 39 on hoist assemblies 40 are used to position stud tensioner tools and stud removal tools during refueling operations.

While the integrated head package is a marked improvement over the conventional head package designs, and adaptable for retrofitting existing reactors or incorporation into new reactor designs, additional problems arise in connection with advanced pressurized water reactor (APWR) systems. In advanced pressurized water reactor systems, displacer rods are interspersed throughout the control rods in the reactor core and displacer rod drive mechanisms, as well as the control rod drive mechanisms, are required above the reactor vessel head. As an example, an advanced pressurized water reactor plant would use a moderator control core which requires the use of 185 drive mechanisms (97 control rod drive mechanisms and 88 displacer rod drive mechanisms). This results in a much more congested upper head area (the area above the pressure vessel head), whereas conventional and integrated head package earlier designs used approximately 50 to 60 control rod drive mechanisms only.

Increased seismic requirements, along with the design of the displacer rod drive mechanisms which is not compatible with current seismic sleeve designs, would require a much stronger (i.e. larger size and/or higher strength material) seismic sleeve design. This, coupled with the increased number of drive mechanisms would only tend to increase the space limitations which already exist. In addition, the vertical missile travel distance (before impact) for an advanced pressurized water reactor is much larger (35 to 37 inches) whereas other integral head package designs have a much shorter missile travel distance (about 5 inches). This increased missile travel distance results in an increased missile load, which, if transferred directly to the lift rods, to which a missile shield is attached, would require a substantial increase in the lift rod diameter.

It is an object of the present invention to provide an improved integrated head package for a nuclear reactor that does not transfer an impact load from a missile, striking the underside of a missile shield plate, to the lift rods and ultimately to the head lugs, closure studs and vessel supports of the reactor system.

It is another object of the present invention to provide an improved integrated head package for a nuclear reactor that can be used as a retrofit on existing reactors or incorporated into new reactors such as advanced pressurized water reactors.

It is a further object of the present invention to provide a nuclear reactor having an integrated head package that eliminates the need to increase the size of lift rods to absorb the impact of missiles and eliminate the need for seismic sleeves about drive rod mechanisms of a reactor system.

SUMMARY OF THE INVENTION

An integrated head package for a nuclear reactor has a missile shield plate that is vertically slidably retained on lift rods that are secured to the reactor pressure vessel head. The package includes a pressure vessel closure head that seals the reactor vessel, and control rod drive mechanisms, and displacer rod drive mechanisms for advanced pressurized water reactors, that are enclosed in a shroud, with the lift rods extending vertically from the pressure vessel closure head and having spaced stop members adjacent the upper ends of the lift rods The missile shield plate extends between the lift rods, above the drive rod mechanisms, and is vertically slidably retained between the spaced stop members, and has a lift rig secured thereto.

The stop members on the lift rods preferably comprise a lower flanged member that is fixedly secured to the lift rod and an upper nut that is threadedly secured to the upper portion of the lift rod. A recess may be provided in the underside of the missile shield plate for seating therein of the lower stop member. The missile shield plate has thereon support blocks to which a support system, such as a tripod support system having a lift ring at the upper end thereof is secured by a clevis and pin securement.

A collar, formed as a plate, is provided on each of the control rod drive mechanisms and displacer rod drive mechanisms, the collars adjacent the upper ends thereof and lying in a common horizontal plane so as to provide a seismic plate for the drive rod mechanisms.

DESCRIPTION OF THE DRAWINGS

FIG. 3 is a view of the integrated head package of the present invention taken from above the collars disposed on the rod drive mechanisms;

FIG. 4 is a view, partially in section of the lift rods, missile shield plate and tripod support system of the integrated head package of the present invention;

DETAILED DESCRIPTION

The present invention is an improved integrated head package for a nuclear reactor which includes a lifting rig and missile shield assembly that transfers the momentum of postulated head missiles into a lifting motion of the lifting rig and missile shield assembly and thus prevents missile generated loads from being transferred to the lift rods, head lugs, closure studs and reactor vessel supports.

Figure 1:
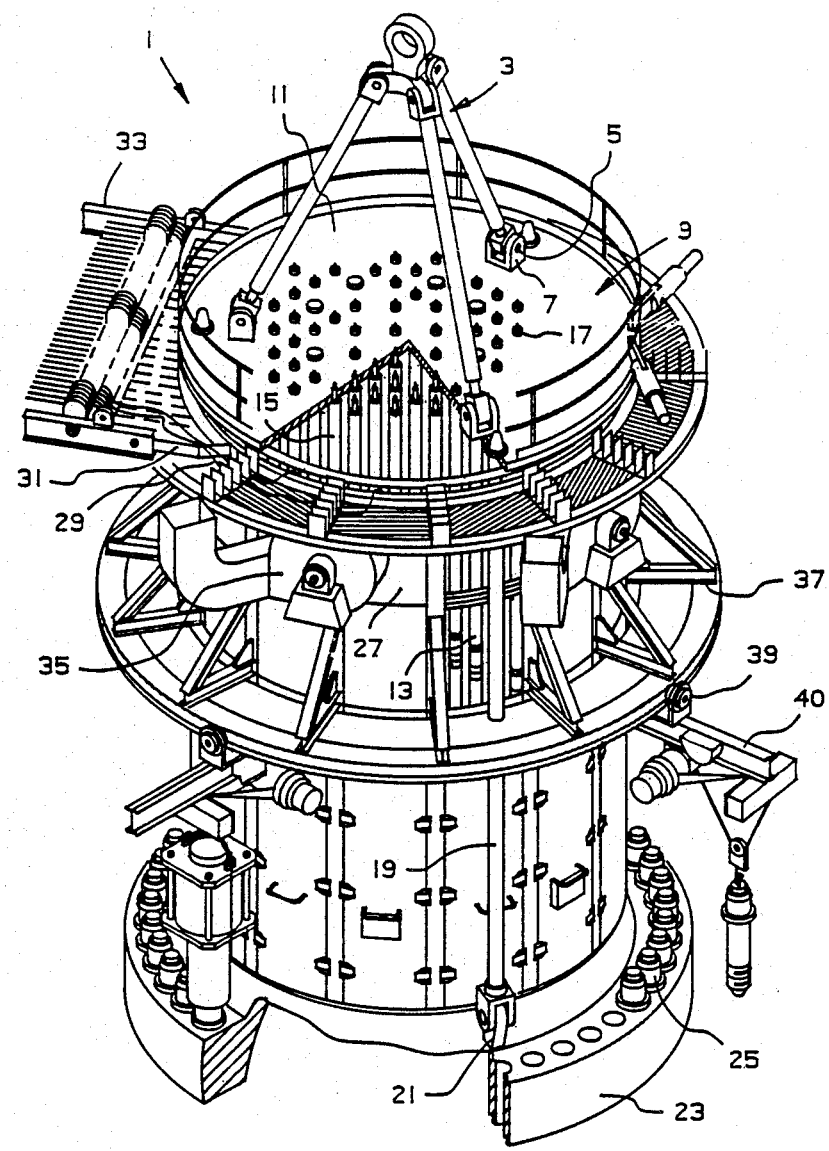
FIG. 1 is a perspective view of a prior art integrated head package for a nuclear reactor.
Figure 2:
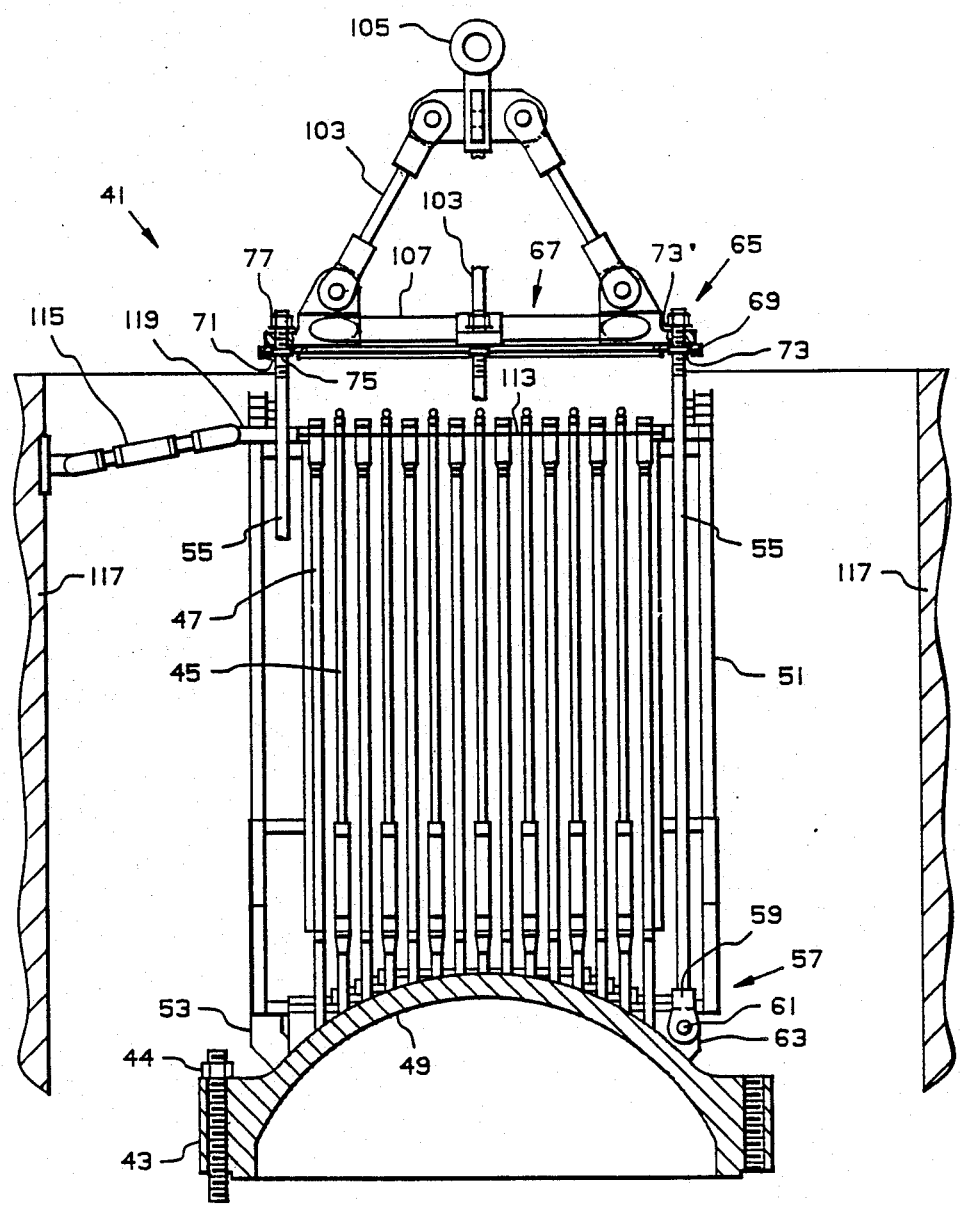
FIG. 2 is a sectional view through an integrated head package for a nuclear reactor of the present invention.
Figure 5:
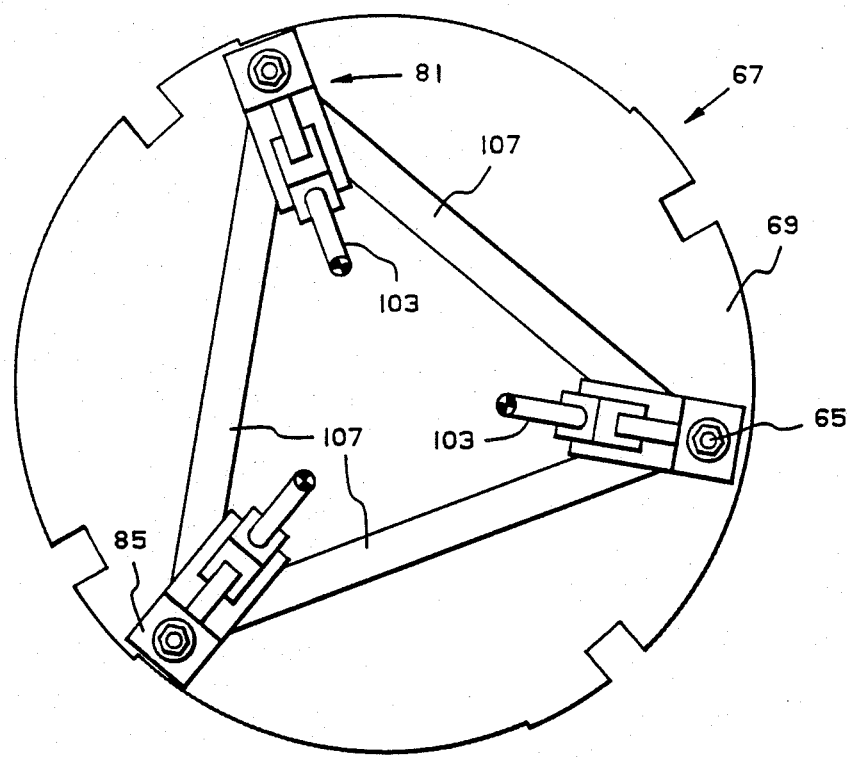
FIG. 5 is a plan view of the missile shield plate taken at a location below the lift ring, along lines V—V of FIG. 4.
Figure 6:
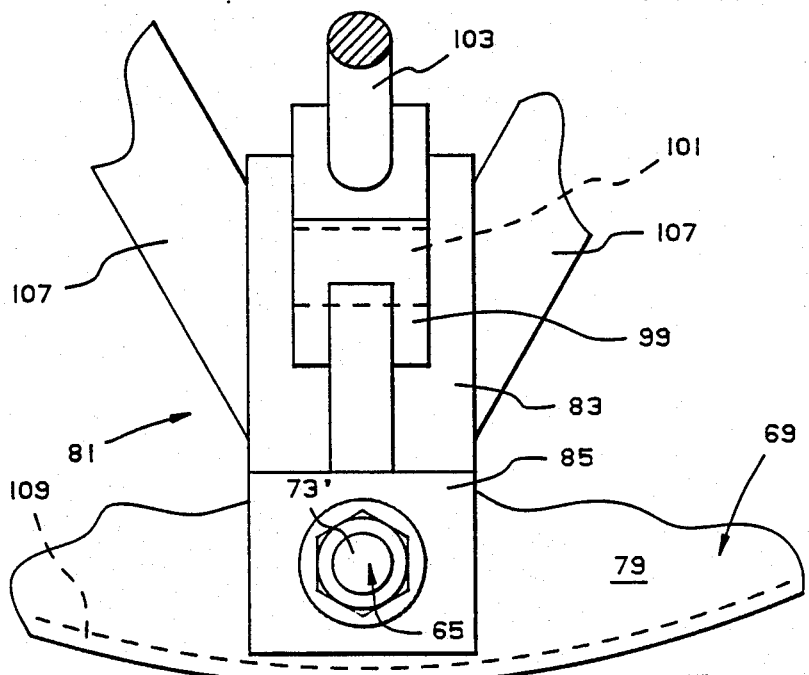
FIG. 6 is an enlarged plan view of a support block area of the missile shield plate.
Figure 7:
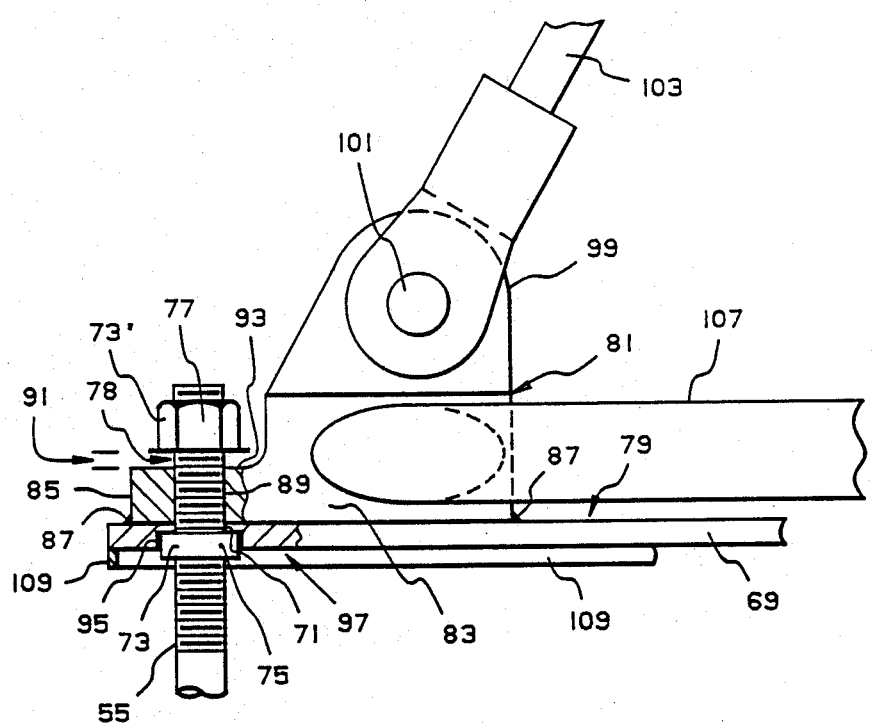
FIG. 7 is a side view of the support block area illustrated in FIG. 6.
Figure 8:
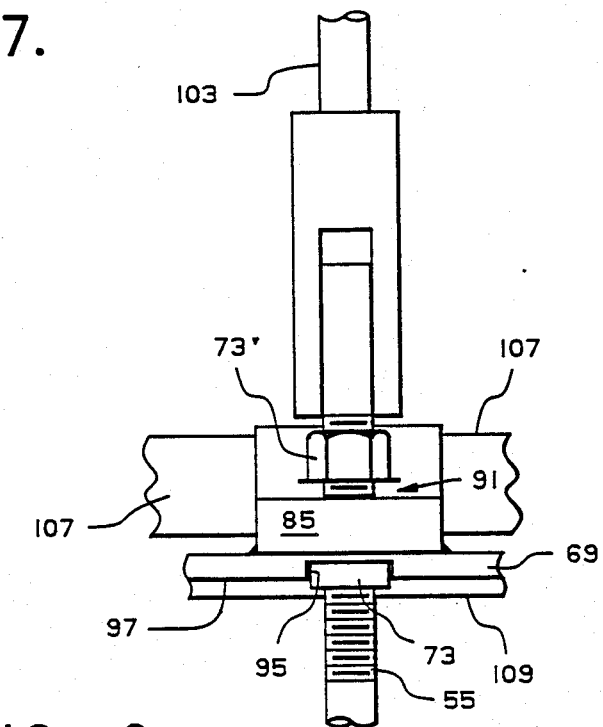
FIG. 8 is an end view of the support block area illustrated in FIG. 6.

Referring now to FIGS. 2 to 8, the integrated head package 41 for an advanced pressurized water reactor system is adapted for sealing of a reactor vessel and has a pressure vessel closure head 43, sealable to the reactor vessel by use of closure studs 44, with control rod drive mechanisms 45 and displacer rod drive mechanisms 47 which pass through and extend above the hemispherically shaped portion 49 thereof. A shroud 51 surrounds the drive mechanisms 45 and 47 of the control rods and displacer rods and rests on shroud support pads 53 on the closure head 43.

A plurality, preferably three, equiangularly, circumferentially spaced vertical lift rods 55 are provided which are attached at their bottom ends 57 by means of a clevis 59 and pin assemblies 61 to head lift lugs 63 which are permanently secured to the closure head 43. The lift rods 55 form an integral part of the closure head lifting assembly such that the closure head 43 and all associated operative components can be removed from the reactor pressure vessel to a storage position, not shown, during a refueling operation, as well as for reinstallation on the pressure vessel following refueling. Adjacent the top ends 65 of the lift rods 55 is a vertically slidably retained missile shield assembly 67 which includes a flat, solid, preferably circular, missile shield plate 69 having apertures 71 adjacent only to the periphery thereof through which the lift rods 55 extend. The missile shield plate 69 extends across the area between the lift rods 55 and is vertically slidably retained at the upper portion 65 of the lift rods 55 between spaced stop members 73, 73', illustrated as a lower flanged member 75 fixed to the lift rod 55, and an upper nut 77 threadedly secured to a threaded section 78 of the lift rod.

On the missile shield plate 69 (FIGS. 4 and 7) are equiangularly, circumferentially spaced support blocks 81 having a wide section 83 and outwardly extending arm 85, the support blocks 81 being permanently secured, such as by welds 87 to the upper surface 79 of the missile shield plate 69. The arms 85 have apertures 89 therethrough which are aligned with apertures 71 in missile shield plate 69 and through which the upper portions 65 of the lift rods 55 also extend.

The stop members 73, 73' are spaced vertically from each other on the lift rod 55 such that a gap 91 is present between the upper surface 93 of the arm 85 and the upper stop member 73'. A recess 95 may be provided in the lower surface 97 of the missile shield plate 69 for seating of the lower stop member 73 therein. The support block 81 has thereon a clevis 99 to which there is pin connected, by means of pins 101, a lift rig comprising a support system 103 preferably a tripod support system, that has a lift ring 105 affixed at the top thereof. Spreader support means, such as cylindrical members 107 are secured to adjacent support blocks 81. The cylindrical members 107 distribute forces acting on the missile shield plate 69 and reinforce the same. Depending downwardly from the outer periphery of the missile shield plate 69 is a skirt 109 which will deflect downwardly any missile that strikes the underside 97 of the plate and is turned outwardly towards the plate periphery.

The lifting gap 91 is of a size sufficient that the missile shield plate 69, upon impact by a missile against the lower surface 75 thereof, will slide upwardly on the lift rods 55 but will not contact the upper stop member 73'. By so sizing the lifting gap 91, all of the missile momentum is transferred to a lifting force and is not transferred to the lifting rods, head lugs, closure studs and pressure vessel supports. The missile shield plate 69 with the associated weight of the support blocks 81, support system 103 and spreader support means 107 thus absorbs missile impact forces and permits the use of smaller size lift rods than would be required if the lift rods had to absorb such an impact through a rigid missile shield plate fixed to the lift rods.

The present integrated head package 41 uses a separate rod position indicator 111, such as collars 113, on each of the control rod drive mechanisms 45 and the displacer rod drive mechanisms 47, the collars 113, in the form of horizontally extending adjacent plate-like members, aligned in a common horizontal plane (FIGS. 2 and 3) to act as a seismic plate. A seismic sleeve on those mechanisms is thus not required. The integrated head package 41 is also stabilized by the use of a plurality, usually six to eight, spaced adjustable stabilizing members 115 which are secured to the walls 117 of the containment well, and to a seismic ring 119 on the shroud 51.

The present improved integrated head package, where a rod position indicator is used for each rod drive mechanism eliminates the need for seismic sleeves on such mechanisms. Current seismic sleeves are approaching the structural limit of the sleeves and such may not be adequate for use with advanced pressurized water reactor plants. Also, the perforation of a missile shield, as in prior art integrated head packages, for interface with the seismic sleeves, requires an increase in the plate thickness since the perforated plate is structurally weaker than a solid plate. Since seismic sleeves, if used in an advanced pressurized water reactor would increase the amount of congestion already present in upper head area designs and increase the difficulty associated with assembling the lifting rig/spreader/missile shield assembly on the head due to the need for engagement of all of the seismic sleeves, the present system, eliminating the need for seismic sleeves is beneficial.

What is claimed is:

1. An integrated head package for a nuclear reactor comprising:
   a pressure vessel closure head for sealing the reactor;
   control rod drive mechanisms for positioning control rods in the core of the reactor;
   a shroud for enclosing said control rod drive mechanism;
   a plurality of vertical lift rods secured to the pressure vessel closure head;
   spaced stop members adjacent the upper ends of each of said vertical lift rods;
   a missile shield plate extending between said lift rods above said control rod drive mechanisms, said plate being subject to possible impact from said control rod drive mechanisms, said plate being vertically slidably retained between the spaced stop members thereof when impacted by said control rod drive mechanism; and
   a lift rig secured to said missile shield plate.

2. An integrated head package for a nuclear reactor as defined in claim 1 wherein displacer rod drive mechanisms are provided for positioning displacer rods in the core of the reactor, with the shroud enclosing both the control rod drive mechanisms and displacer rod drive mechanisms.

3. An integrated head package for a nuclear reactor as defined in claim 1 wherein said spaced stop members comprise a lower flanged member fixed to said lift rod and an upper nut threadedly secured to said lift rod.

4. An integrated head package for a nuclear reactor as defined in claim 1 wherein support blocks are permanently secured to the upper surface of the missile shield plate, said support blocks having apertures therethrough through which the lift rods extend.

5. An integrated head package for a nuclear reactor as defined in claim 4 wherein said support blocks are formed from a wide section and outwardly extending arms having an upper surface, with said apertures formed through said arm and area of the missile shield plate below, and said arm and area below are positioned between said upper and lower stop members.

6. An integrated head package for a nuclear reactor as defined in claim 5 wherein said missile shield plate has a recess in the lower surface thereof, and said lower stop member is seated in said recess.

7. An integrated head package for a nuclear reactor as defined in claim 6 wherein three said lift rods are provided and three said support blocks are provided, each said support block has a clevis thereon, and a tripod support system having a lift ring thereon is pin connected to said support blocks through said clevis.

8. An integrated head package for a nuclear reactor as defined in claim 7 wherein spreader support members extend between adjacent said support blocks.

9. An integrated head package for a nuclear reactor as defined in claim 1 wherein said missile shield plate has a downwardly depending skirt about the periphery thereof.

10. An integrated head package for a nuclear reactor as defined in claim 1 wherein each said control rod drive mechanism and displacer rod drive mechanism has a collar thereon, with said collars being adjacent and aligned in a common horizontal plane such as to provide a seismic plate for said mechanisms.

11. An integrated head package for a nuclear reactor comprising:
    a pressure vessel closure head for sealing the reactor;
    control rod drive mechanisms for positioning control rods in the core of the reactor,
    displacer rod drive mechanisms for positioning displacer rods in the core of the reactor;
    a shroud for enclosing said control rod drive mechanisms and displacer rod drive mechanisms;
    a collar on each of said control rod drive mechanisms and displacer rod drive mechanisms, said collars being adjacent and aligned in a common horizontal plane such as to provide a seismic plate for said mechanisms;
    a plurality of vertical lift rods secured to the pressure vessel closure head;
    spaced stop members adjacent the upper ends of each of said vertical lift rods;
    a missile shield plate extending between said lift rods, said plate comprising a flat, solid, circular plate vertically slidably retained between the spaced stop members thereof; and
    a lift rig secured to said missile shield plate.

12. An integrated head package for a nuclear reactor as defined in claim 11, wherein said missile shield plate has a recess in the lower surface thereof with said lower stop member seated in said recess, and a downwardly depending skirt about the periphery of said missile shield plate.

13. An integrated head package for a nuclear reactor as defined in claim 12 wherein support blocks are permanently secured to the upper surface of the missile shield plate, said support blocks formed from a wide section and outwardly extending arm having an upper surface, with an aperture formed through each said arm, and area of the missile shield plate therebelow, through which the lift rods extend, and said arm and area of the missile shield plate therebelow is positioned between said upper and lower stop members.

14. An integrated head package for a nuclear reactor as defined in claim 13 wherein said spaced stop members comprise a lower flanged member fixed to said lift rod and an upper nut threadedly secured to said lift rods.

15. An integrated head package for a nuclear reactor as defined in claim 14 wherein three said lift rods are provided and three said support blocks are provided, each said support block has a clevis thereon, a tripod support system having a lift ring thereon is pin connected to said support blocks through said clevis, and spreader support members extend between adjacent support blocks.

* * * * *